United States Patent
Roger et al.

(10) Patent No.: US 12,104,632 B2
(45) Date of Patent: Oct. 1, 2024

(54) LOCKING ASSEMBLY

(71) Applicant: IDEMIA IDENTITY & SECURITY FRANCE, Courbevoie (FR)

(72) Inventors: Luc Roger, Courbevoie (FR); Frédéric Touz, Courbevoie (FR); Amil Abdalcanny, Courbevoie (FR); Jean-Claude Savary, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/943,408

(22) Filed: Sep. 13, 2022

(65) Prior Publication Data
US 2023/0077656 A1 Mar. 16, 2023

(30) Foreign Application Priority Data
Sep. 14, 2021 (FR) ...................... 21 09644

(51) Int. Cl.
*F16B 2/12* (2006.01)
*B60R 11/00* (2006.01)
(52) U.S. Cl.
CPC ............... *F16B 2/12* (2013.01); *B60R 11/00* (2013.01); *B60R 2011/0064* (2013.01)
(58) Field of Classification Search
CPC .... F16M 13/02; F16M 13/022; F16M 11/041; F16B 2/12; B60R 11/00; B60R 2011/0064
USPC ............ 248/220.22, 221.11, 222.13, 223.31, 248/223.41, 224.61, 225.11, 225.21
See application file for complete search history.

(56) References Cited

U.S. PATENT DOCUMENTS

| | | | | |
|---|---|---|---|---|
| 4,953,030 A * | 8/1990 | Seo | ........................ | G11B 33/06 348/E5.025 |
| 8,448,829 B2 * | 5/2013 | Watanabe | ............ | H05K 5/0073 224/547 |
| 2006/0186290 A1 * | 8/2006 | Carnevali | ............. | E05B 65/006 248/221.11 |
| 2008/0019768 A1 * | 1/2008 | Thorning | .................. | F16B 2/12 403/374.1 |
| 2012/0223198 A1 * | 9/2012 | Grobe | ...................... | G06F 1/187 248/220.21 |
| 2019/0059320 A1 * | 2/2019 | Ernst | ...................... | F16M 13/02 |

* cited by examiner

*Primary Examiner* — Alfred J Wujciak
(74) *Attorney, Agent, or Firm* — Oblon, McClelland, Maier & Neustadt, L.L.P.

(57) ABSTRACT

A locking assembly configured to lock a vehicle control radar with respect to a support, including a first plate which is configured to be fixedly mounted on one of the support and the vehicle control radar and which has a first face; a second plate configured to be fixedly mounted on the other one of the vehicle control radar and the support, the second plate including a second face configured to be placed facing the first face of the first plate; an end stop configured to prevent the first plate from moving in translation with respect to the second plate in a first direction along a locking direction; and a lock which is separate from the end stop and which is movable in translation along the locking direction, the lock being configured to prevent the first plate from moving in translation with respect to the second plate in a second direction which is opposite to the first direction.

9 Claims, 2 Drawing Sheets

LOCKING ASSEMBLY

FIELD OF THE INVENTION

The invention generally relates to the field of the locking of two elements in a removable and manual manner. The invention is particularly applicable in the case of the locking of a component on a support of the tripod type, more particularly still when the component is large and has a certain weight. For example, the invention can be implemented in the locking of a vehicle control radar on its support.

PRIOR ART

Nowadays, there are various locking assemblies which make it possible to manually lock and unlock two corresponding elements.

For example, there are locking assemblies which are configured to fasten a component to a support, such as a tripod, in a removable and manual manner. Such locking assemblies may comprise, in the case typically of an image capture device of the video camera or photo camera type, screw-fastening means which make it possible to secure the device and its tripod. However, such screw-fastening means do not permit a solid and robust fastening and are hardly conceivable when the component to be fastened is bulky and heavy as is notably the case with a vehicle control radar. Moreover, these radars have to be fastened high up, such that the operator has to proceed in a blind manner, that is to say without being able to see the locking assembly during the coupling of the elements, or be assisted.

SUMMARY OF THE INVENTION

An object of the invention is to remedy the above-mentioned drawbacks by proposing a fastening assembly for fastening a first element to a second element, notably a vehicle control radar to a support of the tripod type, said fastening assembly being able to be locked and unlocked manually and in a blind manner by an operator and being simple to produce and easily adaptable to any type of element, regardless of its size and its weight.

To this end, according to a first aspect of the invention, a locking assembly for locking a first element with respect to a second element is proposed, comprising:
  a first plate which is configured to be fixedly mounted on the first element and which has a first face;
  a second plate configured to be fixedly mounted on the second element, the second plate comprising a second face configured to be placed facing the first face of the first plate;
  an end stop configured to prevent the first plate from moving in translation with respect to the second plate in a first direction along a locking direction; and
  a lock which is separate from the end stop and which is movable in translation along the locking direction, the lock being configured to prevent the first plate from moving in translation with respect to the second plate in a second direction which is opposite to the first direction.

In particular, the second element is a vehicle control radar and the first element is a support. The first plate is configured to be fixedly mounted on one of the support and the vehicle control radar. The second plate is configured to be fixedly mounted on the other one of the vehicle control radar and the support.

Certain preferred but non-limiting features of the locking assembly according to the first aspect are as follows, taken individually or in combination:
  the lock comprises a strike mounted on the second plate, an attachment which is fastened to one of the first face of the first plate and the strike and which comprises a blocking groove, and a cutout which is formed in the other one of the first face of the first plate and the strike and which is configured to receive the attachment, the cutout being delimited by a rim. Furthermore, the strike is movable in translation along the locking direction between a locking configuration, in which the rim of the cutout is inserted in the blocking groove of the attachment and prevents the strike from moving in translation with respect to the first and the second plate in the second direction, and an unlocking configuration, in which the rim of the cutout is released from the blocking groove of the attachment. If necessary, the blocking groove is further configured to prevent the second plate from moving in translation with respect to the first plate in a direction normal to the first face of the first plate;
  the attachment comprises a chamfer which converges from a base of the attachment in the direction of the cutout, the blocking groove being formed in the vicinity of the base of the attachment;
  the strike is connected to the second plate by way of a return means configured to return the strike to the locked configuration, the end stop, the return means and the strike being aligned along the locking direction;
  the strike is fastened to the second plate by way of spacers which are configured to ensure play between the strike and the second plate;
  the end stop comprises: a tab extending from one of the first plate and the second plate, and an opening formed in the other one of the first plate and the second plate, the opening being delimited by a wall, the tab being configured to bear against the wall of the opening;
  the locking assembly further comprises a lip extending from the wall in the direction of the tab, the tab and the lip being inclined and substantially parallel such that the tab is configured to come into surface contact with the lip when the first element is locked with respect to the second element, so as to prevent the second plate from moving in translation with respect to the first plate in a direction normal to the first face of the first plate;
  a dimension of the opening formed in the other one of the first plate and the second plate in the locking direction is at least equal to one fifth of a dimension of the other one of the first plate and the second plate in the locking direction; and/or
  the lock is made of a material exhibiting a Young's modulus greater than the Young's modulus of the first and of the second plate.

According to a second aspect, the invention proposes a vehicle control system comprising:
  a support, for example a tripod;
  a vehicle control radar; and
  the locking assembly according to the first aspect, the first plate being mounted on one of the support and the vehicle control radar, and the second plate being mounted on the other one of the support and the vehicle control radar.

DESCRIPTION OF THE FIGURES

Further features, objects and advantages of the invention will become apparent from the following description, which is purely illustrative and non-limiting and should be read in conjunction with the appended drawings, in which.

In all of the figures, similar elements bear identical references.

DETAILED DESCRIPTION OF THE INVENTION

Figure 1:
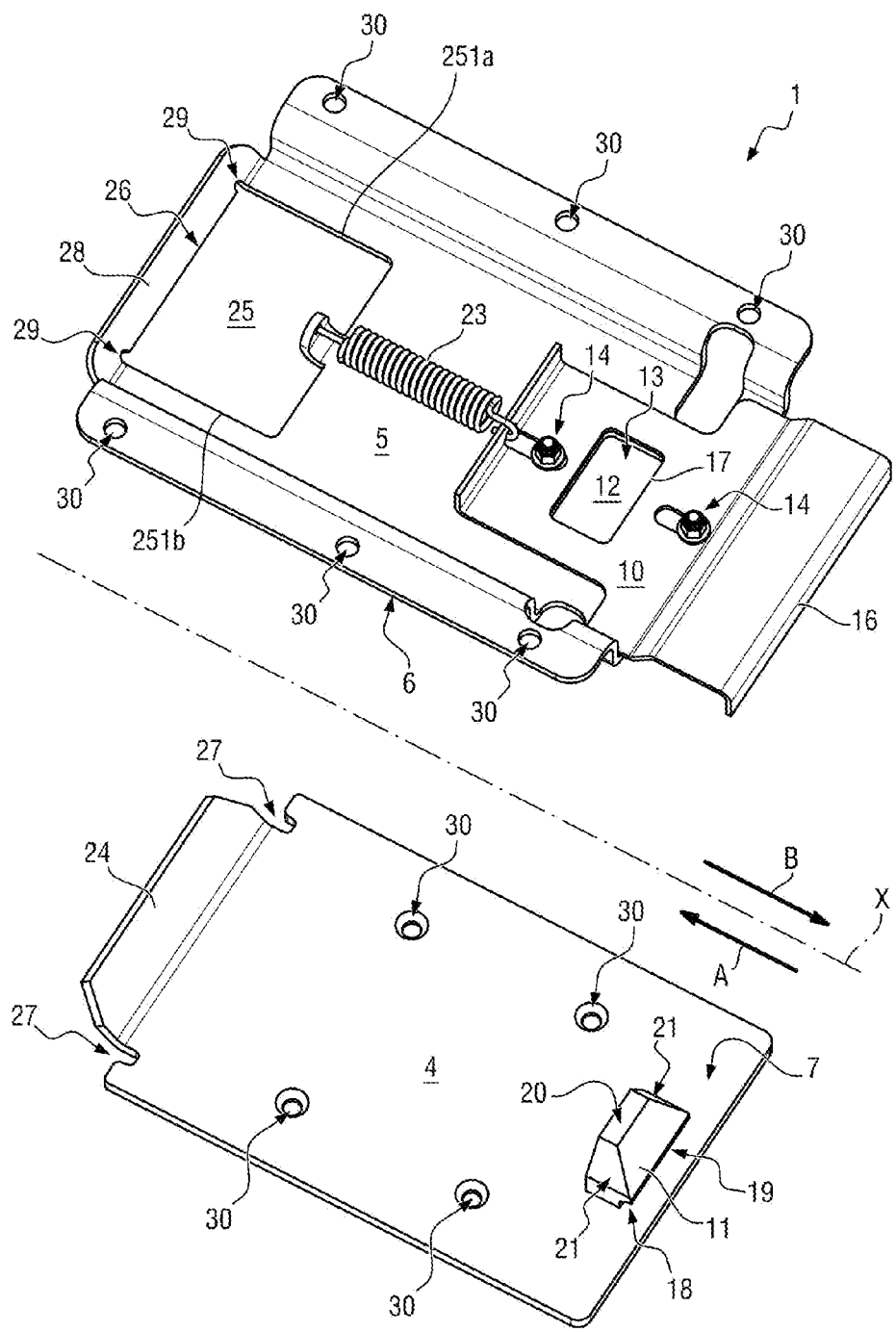
FIG. 1 is an exploded view of an example of a locking assembly in accordance with one embodiment of the invention.

In the description that follows, the invention will more particularly be described in the case of the locking of a vehicle control system comprising a vehicle control radar 2 and a tripod 3. This is, however, not limiting, the locking assembly 1 of the invention being able to be implemented in the removable fastening of any two components.

The locking assembly 1 comprises a first plate 4 and a second plate 5 which are configured to be mounted on the tripod 3 and the vehicle control radar 2, respectively.

Each plate 4, 5 comprises a first face, or upper face, and a second face, or lower face, the upper face 7 of the first plate 4 being configured to be placed facing the lower face 6 of the second plate 5.

In the text that follows, the invention will be described in the case in which the first plate 4 is fixedly mounted on the tripod 3, whereas the second plate 5 is fixedly mounted on the radar 2. To simplify reading, the first plate 4 will therefore be referred to as "lower plate 4" and the second plate 5 as "upper plate 5". Here again, this is not limiting, the first plate 4 being able to be fastened to the radar 2 and located below the second plate 5 which would then be fastened to the tripod 3.

In order to facilitate the mounting of the radar 2, which is heavy and bulky, on the tripod 3, the upper plate 5 and the lower plate 4 may be substantially planar. They may notably each comprise a metal sheet, which are made of any suitable material such as aluminium or steel.

The locking assembly 1 further comprises an end stop 8 configured to prevent the first plate 4 from moving in translation with respect to the second plate 5 in a first direction A along a locking direction X, and also a lock 9 which is movable in translation along the locking direction X and which is configured to prevent the upper plate 5 from moving in translation with respect to the lower plate 4 in a second direction B which is opposite to the first direction A. The simple actuation of the lock 9 thus allows the upper plate 5 to be locked on or unlocked from the lower plate 4, depending on the chosen direction of translation along the locking direction X.

In one embodiment, the lock 9 comprises a strike 10, an attachment 11 and a cutout 12 configured to receive the attachment 11.

The strike 10 is mounted on one of the upper plate 5 or the lower plate 4. For example, in the example illustrated in the figures, the strike 10 is mounted on the upper face 7 of the upper plate 5, which then comprises a through-passage 13 which partially exposes the strike 10 and allows the attachment 11 to cooperate with the cutout 12. In a variant, the strike 10 could be mounted on the lower face 6 of the upper plate 5. As will be shown below, the mounting of the strike 10 on the plate situated above (in this case the upper plate) has the advantage of being more ergonomic for the operator.

Furthermore, the strike 10 is movable in translation along the locking direction X between a locking configuration and an unlocking configuration. To this end, the strike 10 may for example be mounted on the upper plate 5 by way of a sliding connection 14. The sliding connection 14 can typically comprise at least one rail formed in the upper plate 5 and a series of bolts. In a manner known per se, each bolt comprises a screw and a nut, the head of the screw being placed in the rail, whereas its shank is inserted in corresponding holes which are formed in the strike 10 and is fastened to the strike 10 by means of the corresponding nut. If necessary, in order to facilitate the clamping of the strike 10 on the upper plate 5 while still ensuring that it can slide in a relative manner, washers (or spacers 15) are force-fitted onto the shank of the bolts and accommodated within the holes of the strike 10. Preferably, the spacers 15 have a thickness greater than that of the strike 10 in order to facilitate the clamping of the bolts.

The strike 10 may comprise a handle 16 in order to facilitate the manipulation of the lock 9 by the operator. This handle 16 is preferably placed in the vicinity of an edge of the strike 10 in order to be easily accessible to the operator.

Advantageously, the handle 16 is oriented perpendicularly with respect to the locking direction X in order to facilitate the actuation of the mechanism by the operator.

The attachment 11 is fastened to one of the upper face 7 of the lower plate 4 and the strike 10, whereas the cutout 12 is formed in the other one of the upper face 7 of the lower plate 4 and the strike 10 and is configured to receive the attachment 11.

Figure 2:
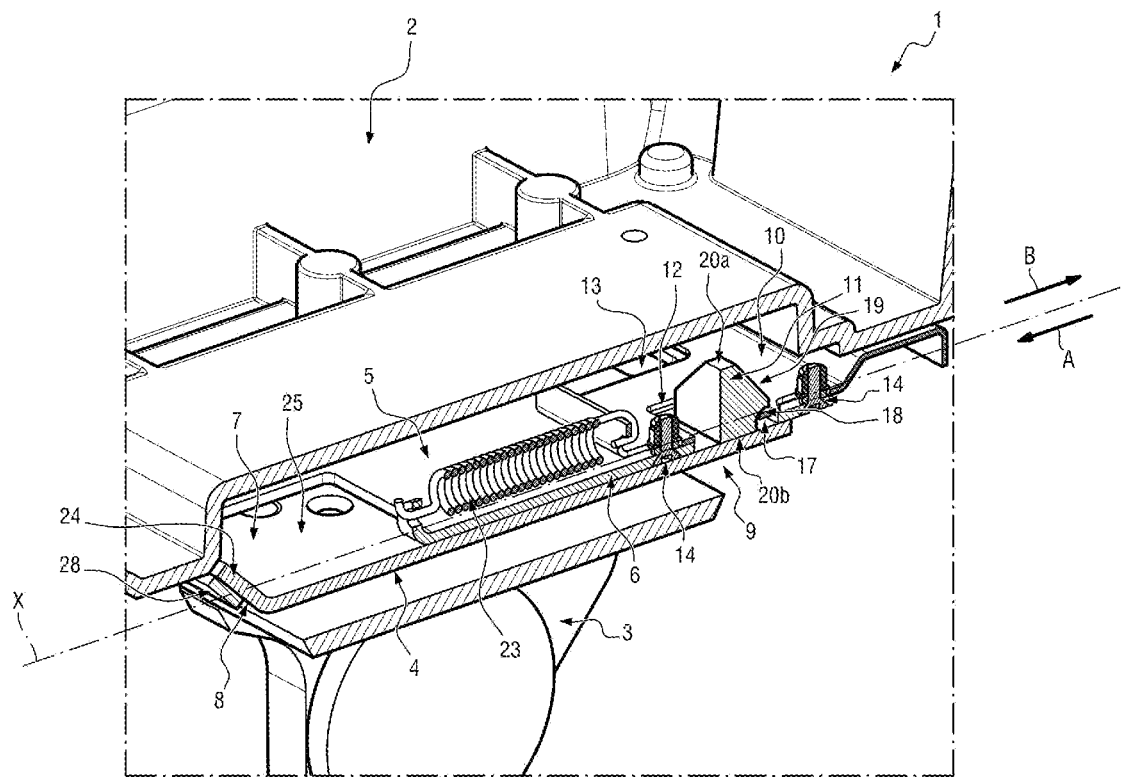
FIG. 2 is a perspective view in section of a system comprising the locking assembly in FIG. 1 mounted on a first and a second element.
Figure 3:
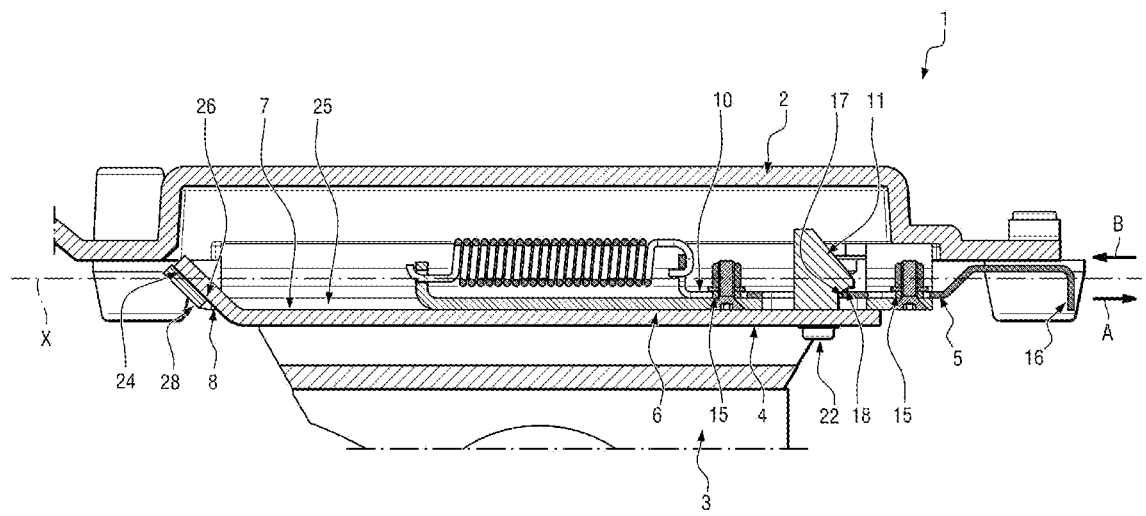
FIG. 3 is a view in section of the system in FIG. 2.

In a first embodiment, which is visible here in FIGS. 1 to 3, the attachment 11 is fastened to the upper face 7 of the lower plate 4 and protrudes in the direction of the strike 10, whereas the cutout 12 is formed in the strike 10. In this case, the cutout 12 is a through-orifice, that is to say an orifice which leads up to the two opposite faces of the strike 10 in order to allow the attachment 11 to pass right through, and which is delimited by an internal rim 17 of the strike 10. This is, however, not limiting, the strike 10 being able to be thick and the cutout 12 deep enough to receive the entire volume of the attachment 11.

Since the strike 10 is in this case placed against the upper face 7 of the upper plate 5, the cutout 12 further extends in the continuation of the through-passage 13 formed in the upper plate 5 in order to be able to receive the attachment 11.

A blocking groove 18 is formed in that face of the attachment 11 which is opposite to the end stop 8. Thus, when the attachment 11 is introduced into the cutout 12 and the strike 10 is brought into the locking configuration, the rim 17 of the cutout 12 is inserted in the blocking groove 18 of the attachment 11 and prevents the strike 10 from moving in translation with respect to the plates 4, 5 in the second direction B. Since the rim 17 is introduced into the blocking groove 18, it is then not possible for the attachment 11 to exit from the cutout 12, the upper face 7 of the strike 10 being pressed against the facing face of the blocking groove 18. The blocking groove 18 therefore also makes it possible to prevent the upper plate 5 from moving in translation with respect to the lower plate 4 in a direction normal to the upper face 7 of the first plate 4. By contrast, when the strike 10 is brought into its unlocking configuration, the rim 17 of the cutout 12 is released from the blocking groove 18 of the attachment 11, this allowing the attachment 11 to exit from the cutout 12 and the two plates 4, 5 to be separated.

In order to facilitate the blind insertion of the attachment 11 in the cutout 12, the attachment 11 comprises a chamfer 19 which makes it possible for the rim 17 of the cutout 12 to slide along the attachment 11 as far as the blocking groove 18. To this end, the blocking groove 18 is formed in the base 20b of the chamfer 19 (in the vicinity of the lower plate 4), and the chamfer 19 is shaped so as to converge from the base 20b of the attachment 11, in the vicinity of the blocking groove 18, in the direction of the cutout 12. The surface of the chamfer 19 is therefore inclined and forms, at its apex 20a, an acute angle which may be between 35° and 60°, preferably between 40° and 50°.

In this way, during the assembly of the two plates 4, 5, the rim 17 slides along the inclined surface of the chamfer 19 of the attachment 11 until it reaches the blocking groove 18. It is therefore not necessary for the operator to place the attachment 11 facing the cutout 12 in a precise manner since the rim 17 of the cutout 12 is guided by the chamfer 19 to the blocking groove 18.

Optionally, the attachment 11 may have a substantially square section at the base 20b and comprise lateral chamfers 21 (which are visible, for example, in FIGS. 1 and 3) perpendicular to the chamfer 19 which converge from the base 20b towards the apex 20 of the attachment. These lateral chamfers 21 also contribute to the guiding of the rim 17 of the cutout 12, in particular when the width of the cutout in a direction perpendicular to the locking direction is at most equal to 120% of the width of the attachment 11 in this direction. This adjustment of the width of the cutout 12 with respect to the width of the attachment 11 limits the risks of the attachment 11 exiting in an unintentional manner.

The attachment 11 and the strike 10 are preferably made of materials which are resistant to wear and friction, typically stainless steel. The attachment 11 may be made of the same material as the lower plate 4, in which case it may be in one piece with the lower plate 4, or may be made of a material different from the lower plate 4, for example for reasons of cost or density, in which case it may be connected and fastened to the lower plate 4. For example, the attachment 11 may be fastened to the lower plate 4 by means of a screw 22. If necessary, the head of the screw may be milled so as not to protrude from the lower face 6 of the lower plate 4.

In a second embodiment (not illustrated) which is equivalent to the first, the attachment 11 is fastened to the strike 10 and protrudes (if necessary, through the through-passage 13 formed in the upper plate 5) in the direction of the upper face 7 of the lower plate 4, whereas the cutout 12 is formed in and leads to the upper face 7 of the lower plate 4.

In order to ensure that the attachment ills blocked in the cutout 12, the strike 10 is connected to the upper plate 5 by way of a return means 23 configured to return the strike 10 to its locked configuration. The return means 23 may notably comprise a tension spring 23.

The spring 23 may comprise a first end fastened to the upper plate 5, preferably to the same face as the strike 10, and a second end fastened to the strike 10. The return spring 23 is aligned with the locking direction X and is positioned on the upper plate 5 so as to be located in the direction away from the handle 16.

The stiffness of the spring 23 is further chosen such that, in the absence of forces applied to the strike 10, the spring 23 brings the strike 10 into its locked configuration and retains it there and, when an operator applies a reasonable force to the strike 10, said spring is able to bring said strike into its unlocked configuration without any difficulty. The stiffness of the spring 23 may for example be between 3 and 3.6 N/mm. In this way, when an operator is locking the radar 2 on the tripod 3, it suffices for them to place the apex 20a of the attachment 11 facing the cutout 12 and then to let the edge of the cutout 12 slide along the chamfer 19 of the attachment 11. Under the effect of the weight of the radar 2, which may possibly be supplemented by gentle pressure from the operator, the chamfer 19 applies a force to the strike 10 which opposes the return force of the spring 23 and exceeds the latter, and this moves the strike 10 to its unlocking configuration. Advantageously, the operator does not need to pull on the handle 16 in the second direction along the locking direction X. Thus, the operator can hold the radar 2, which is very heavy and large, with both of their hands. When the rim 17 is accommodated in the blocking groove 18, the chamfer 19 no longer offers any resistance to the strike 10: the return force applied to the strike 10 by the spring 23 then has the effect of automatically bringing said strike into its locked configuration. If necessary, the insertion of the rim 17 in the blocking groove 18 may produce a sound effect (a clicking noise) which confirms to the operator that the attachment 11 and the rim 17 are engaged. The spring 23 then ensures that the rim 17 is retained in the blocking groove 18, this limiting the risks of the attachment 11 exiting from the cutout 12 in an unintentional manner, even if the radar 2 is tilted. It then suffices for an operator to release the rim 17, for example by pulling on the handle 16 of the strike 10, in order to separate the plates 4, 5.

In an embodiment variant, the return means 23 may comprise a compression spring. In this variant, the spring 23 is then placed on the side of the handle 16 so as to be able to bring the strike 10 into its locked configuration and retain it there. However, the mounting of a compression spring 23 has the risk of being more bulky than the mounting of a tension spring 23 taking account of the presence of the handle 16.

The end stop 8 may comprise any means allowing the upper plate 5 to be placed in axial abutment with respect to the lower plate 4 along the locking direction X.

In one embodiment, the end stop 8 may for example comprise a tab 24 which extends from the lower plate 4 and which is configured to be inserted in an opening 25 formed in the upper plate 5 and to bear against a wall 26 delimiting this opening 25. The tab 24 may for example comprise a panel extending from the upper face 7 of the lower plate 4 while forming an obtuse angle with the latter. This embodiment thus makes it possible to produce an end stop 8 in a very simple manner, for example by bending the lower plate 4 so as to obtain the inclined tab 24 and by producing, for example by laser, the opening 25 in the upper plate 5. If necessary, the lower plate 4 may be trimmed in order to form notches 27 on either side of the bend of the tab 24 which extend from the bend in the direction of the strike 10. The notches 27 then limit the defects and burrs during the bending of the tab 24 and, optionally, engagement with the wall 26 of the upper plate 5. The tab 24 and the upper plate 5 are then in one piece, this simplifying the manufacture of the locking assembly 1.

In an embodiment variant, the upper plate 5 may comprise a lip 28 which extends from the wall 26 delimiting the opening 24 formed in the upper plate 5. The lip 28 extends substantially parallel to the tab 24. In this way, when the tab 24 is introduced into the opening 25 formed in the upper plate 5, the lower surface of said tab comes into surface contact with the lower surface of the lip 28, when the upper plate 5 is locked with respect to the lower plate 4. Thus, when the tab 24 is in surface contact with the lip 28, the lower face 6 of the upper plate 5 and the upper face 7 of the lower plate 4 are in surface contact, whereas it is the lower surface of the tab 24 (in the continuation of the face opposite to the upper face 7) which is in surface contact with the lower surface of the lip 28 (in the continuation of the face opposite to the lower face 6). Those faces of the plates 4, 5 which are in surface contact on the parts of the tab 24 and of the lip 28 are opposite to those faces 6, 7 of the plates 4, 5 which are in contact on the planar main parts. The parts in contact on one face of a plate are in contact on the other face at the tab 24 and the lip 28.

Advantageously, the tab 24 and the lip 28 are inclined with respect to the faces 6, 7 of the corresponding plate 4, 5. The tab 24 and the lip 28 may for example form an angle of between 100° and 150°, preferably between 120° and 140°, with the corresponding plate 5, 4.

The particular arrangement of the tab 24 with respect to the lip 28 and their inclination with respect to the plates 5, 4 makes it possible, when the tab 24 and the lip 28 are in surface contact, for the upper plate 5 to be prevented from moving in translation with respect to the lower plate 4 along the locking direction X and in the direction normal to the upper face 7 of the lower plate 4.

The tab 24 and the lip 28 may further be in one piece with the corresponding plate. The tab 24 and the lip 28 are for example obtained by bending of the corresponding plate 4, 5.

Preferably, the tab 24 and the lip 28 extend from that edge of the corresponding plate 5, 4 which is opposite to the lock 9. This configuration specifically makes it possible to improve the engagement of the lock 9 and of the end stop 8 (which apply forces to the plates 4, 5 in opposite directions), and also the ergonomics of the locking assembly 1.

The opening 25 is delimited by two longitudinal edges 251a, 251b which are oriented in the locking direction X. These longitudinal edges 251a, 251b may, if necessary, form guides for a sliding in translation of the tab 24 within the opening 25 as far as the wall 26 and/or the lip 28.

Thus, a length of the longitudinal edges 251a, 251b of the opening 25 in the locking direction is at least equal to two centimetres, preferably at least equal to five centimetres, in order to simplify the blind insertion of the tab 24 in the opening 25 and then its sliding within the opening along the two guides which are formed by said longitudinal edges 251a, 251b.

In another embodiment (not illustrated in the figures), the end stop 8 comprises one or more studs extending from one of the lower face 6 of the upper plate 5 and the upper face 7 of the lower plate 4, and an equal number of holes which are formed in the other one of the lower face 6 of the upper plate 5 and the upper face 7 of the lower plate 4 and which are configured to receive a corresponding stud.

Regardless of the embodiment of the end stop 8, the tension spring 23, the strike 10 and, if applicable, the handle 16 are aligned, preferably in succession, along the locking direction X. This configuration specifically makes it possible to prevent the plates 4, 5 from pivoting with respect to one another when the attachment 11 is locked in the cutout 12 and the plates 4, 5 are in abutment. Said configuration further makes the locking assembly 1 particularly ergonomic and easy to engage for the operator.

The plates 4, 5 can be mounted on any element, and in particular any radar 2 and any tripod 3.

In order to make the plates 4, 5 universal, a series of bores 30 may be provided in order to make it possible to fasten each plate 4, 5 to the corresponding element 2, 3 by means of screws. Preferably, each plate 4, 5 comprises at least four bores 30. Optionally, a greater number of bores 30 may be provided in order to make it possible to adapt the plates 4, 5 to a greater number of radars 2 and tripods 3.

The assembly 1 may be locked as follows, for example in the case of the locking of a radar 2 on a tripod 3.

The tripod 3 is placed, preferably upright (vertically), on the ground. The lower plate 4 is fastened to the apex 20a of the tripod 3 and extends parallel to the ground (horizontally). The upper plate 5 is fastened to the lower face of the radar 2. If applicable, the lower face of the radar 2 may be adapted for fastening of the upper plate 5 and insertion of the attachment 11 in the cutout 12. For example, an indentation may be formed in the lower face of the radar 2 in order to receive the spring 23, the strike 10 and the attachment 11 in a contactless manner.

The plates 4, 5 may for example be fastened by screw-fastening to the radar 2 and the tripod 3.

In order to lock a movable radar 2 comprising an upper plate 5 on a stationary tripod 3 comprising a lower plate 4, the operator first of all places the two plates 4, 5 in abutment, in particular by positioning the radar 2 such that the tab 24 of the lower plate 4 is placed in the opening 25 of the upper plate 5. Then, the operator slides the upper plate 5 of the radar 2 in the locking direction X and the second direction B until the tab 24 arrives, at the end of travel, against the wall 26 of the opening 25. When the upper plate 5 comprises a lip 28, the sliding of the tab 24 within the opening 25 is effected in the direction of the lip 28. At the end of travel within the opening 25, the tab 24 and the lip 28 are in contact with one another.

The upper plate 5 is then in axial abutment against the lower plate 4, and this prevents the radar 2 from moving with respect to the tripod 3 in the second direction B.

The operator then pivots the radar 2 about the tab 24 so as to bring the plates 4, 5 closer together. In particular, the radar 2 pivots about the contact surface of the tab 24 and the lip 28. This movement allows the attachment 11 to be placed in the cutout 12. The rim 17 of the cutout 12 slides along the chamfer 19 of the attachment 11 until it reaches the blocking groove 18. This movement has the effect of overcoming the force applied to the strike 10 by the spring 23 and of moving the strike 10 in translation with respect to the upper plate 5, notably by virtue of the weight applied to the attachment 11 by the radar 2. Once the rim 17 reaches the blocking groove 18, the force applied by the spring 23 has the effect of returning the strike 10 (in the first direction A) against the attachment 11, under the blocking groove 18. A sound effect may be produced (a clicking noise), thus confirming the locking of the radar 2 on the tripod 3 (that is to say the locking of the assembly 1).

The upper face 7 of the attachment 11 is in abutment against the upper face 7 of the strike 10 and is retained in this position by the spring 23, this preventing any unintentional separation of the plates 4, 5.

In order to unlock the assembly 1, the operator pulls on the handle 16 in the second direction B, thus releasing the rim 17 of the cutout 12 from the blocking groove 18 of the attachment 11. Then, while still keeping the handle in the pulled position, the operator pivots the radar 2 about the tab 24 so as to move the plates 4, 5 away from one another. In particular, the radar 2 pivots about the contact surface of the tab 24 and the lip 28. This makes it possible for the attachment 11 to exit from the cutout 12. Once the attachment 11 has exited from the cutout 12, the operator slides the upper plate 5 so as to move the wall 26 and, if applicable, the lip 28 away from the tab 24 in the locking direction X and the first direction A. Then, the operator lifts the radar 2 in order to remove the tab 24 from the opening 25 formed in the upper plate 5.

By way of indication, a vehicle control radar 2 can weigh up to 10 kg and is generally fastened in a blind manner to a tripod 3 at a height of 1.60 m. The locking assembly 1 thus makes it possible to removably fasten the radar 2, which is heavy, to the tripod 3, which is relatively high, in a simple, rapid and ergonomic manner.

The invention claimed is:

1. A locking assembly configured to lock a vehicle control radar with respect to a support, comprising:
    a first plate configured to be fixedly mounted on one of the support and the vehicle control radar and which has a first face;
    a second plate configured to be fixedly mounted on the other one of the vehicle control radar and the support, the second plate comprising a second face configured to be placed facing the first face of the first plate;
    an end stop configured to prevent the first plate from moving in translation with respect to the second plate in a first direction along a locking direction;
    a lock separate from the end stop and configured to prevent the first plate from moving in translation with respect to the second plate in a second direction which is opposite to the first direction,
    wherein the lock includes:
        a strike mounted on the second plate, the strike being movable in translation along the locking direction between locking and unlocking configurations,
        an attachment fastened to one of the first face of the first plate and the strike, and
        a cutout formed in the other one of the first face of the first plate and the strike, the cutout being configured to receive the attachment.

2. The locking assembly according to claim 1, wherein said attachment comprises a blocking groove,
    wherein the cutout is delimited by a rim,
    wherein the strike is movable in translation along the locking direction between a locking configuration, wherein the rim of the cutout is inserted in the blocking groove of the attachment and prevents the strike from moving in translation with respect to the first and the second plate in the second direction, and an unlocking configuration, wherein the rim of the cutout is released from the blocking groove of the attachment, and
    wherein the blocking groove is configured to prevent the second plate from moving in translation with respect to the first plate in a direction normal to the first face of the first plate.

3. The locking assembly according to claim 2, wherein the attachment comprises a chamfer which converges from a base of the attachment in the direction of the cutout, the blocking groove being formed in the vicinity of the base of the attachment.

4. The assembly according to claim 2, wherein the strike is connected to the second plate with a return means configured to return the strike to the locked configuration, the end stop, the return means and the strike being aligned along the locking direction.

5. The assembly according to claim 2, wherein the strike is fastened to the second plate with spacers configured to ensure play between the strike and the second plate.

6. The locking assembly according to claim 1, wherein the end stop comprises:
    a tab extending from one of the first plate and the second plate, and
    an opening formed in the other one of the first plate and the second plate, the opening being delimited by a wall, the tab being configured to bear against the wall of the opening.

7. The locking assembly according to claim 6, further comprising a lip extending from the wall in the direction of the tab, the tab and the lip being inclined and substantially parallel such that the tab is configured to come into surface contact with the lip when the vehicle control radar is locked with respect to the support, so as to prevent the second plate from moving in translation with respect to the first plate in a direction normal to the first face of the first plate.

8. The locking assembly according to claim 6, wherein a dimension of the opening formed in the other one of the first plate and the second plate in the locking direction is at least equal to one fifth of a dimension of the other one of the first plate and the second plate in the locking direction.

9. The locking assembly according to claim 1, wherein the lock is made of a material exhibiting a Young's modulus greater than the Young's modulus of the first and of the second plate.

* * * * *